Sept. 27, 1966  A. A. BERNARD ETAL  3,275,796
ARC WELDING CONTROL SYSTEM

Filed Nov. 19, 1965  2 Sheets-Sheet 1

Inventors:
Arthur A. Bernard,
Richard A. Bernard,
By Hume, Groen, Clement & Hume
attys Sept. 27, 1966  A. A. BERNARD ETAL  3,275,796
ARC WELDING CONTROL SYSTEM
Filed Nov. 19, 1965  2 Sheets-Sheet 2

Inventors:
Arthur A. Bernard,
Richard A. Bernard,
By Hume, Groen, Clement & Hume
Attys

United States Patent Office 3,275,796
Patented Sept. 27, 1966

3,275,796
ARC WELDING CONTROL SYSTEM
Arthur A. Bernard, Beecher, and Richard A. Bernard, Flossmoor, Ill., assignors to Beecher Products Company, Beecher, Ill., a corporation of Illinois
Filed Nov. 19, 1965, Ser. No. 508,689
16 Claims. (Cl. 219—130)

This invention relates to arc welding and, in particular, to a control system whereby the flow of gas is used for controlling some or all of the electrical components contained in the welding apparatus. Simply described, this system as embodied in gas-shielded arc welding apparatus comprises a trigger-operated gas valve located in the welding gun, at least one remote, gas-pressure-operated switch device for controlling the welding current power source and other electrical components of the welding apparatus, and means providing communication between the gas valve and the pressure-operated switch device. When the trigger is pressed, the gas valve opens, blanketing the welding operation with shielding gas and simultaneously causing a pressure change to be transmitted to turn on the pressure-operated switch device. When the trigger is released, the gas valve closes, shutting off the flow of shielding gas and causing an opposite pressure change to be transmitted to turn off the pressure-operated switch device to de-energize the welding apparatus.

The main object of this invention is to remove the hazard of electric shock which exists in conventional arc welding guns. Conventionally there are three types of electric control systems in general practice. The system most widely used contains an electric switch in the handle of the welding gun operated by a trigger, similar to the switches in such hand tools as electric drills. When the trigger is pressed to close this switch, the welding power is turned on, and through various relay switches the electrode feeding machine is energized, and a solenoid valve is opened which turns on the shielding gas to the welding operation. And, when the trigger-operated electric switch in the handle of the gun is released to the "off" position, welding current is cut off, the electrode feeding ceases, and the flow of shielding gas through the solenoid valve is cut off. The possibility of electric shock by this control system is increased for the reason that the welding gun heats up during the actual welding operation and cools down during the nonwelding periods. This produces condensation, and the condensation provides conduction for the flow of current from the terminals of the switch to the welding operator's hand. This wetness from condensation is particularly present to a great extent when the welding gun is cooled by water which flows through the gun at temperatures below ambient air temperature. Also, a large amount of arc welding with welding guns is performed in the field, unprotected from weather, on bridges, buildings, boats, pipelines and the like, in snow and in rain, which increases the hazard. Certain manufacturers of welding equipment have reduced the hazard by using hermetically sealed switches in the handle of the welding guns, but the seals become ruptured or otherwise inefficient, and the safety that the operators rely upon does not exist. Other manufacturers of welding guns provide a ground wire from the switch to a common ground, but these ground wires become broken, are accidently disconnected and, in certain cases, are deliberately disconnected to prevent these safety ground wires from also grounding the welding current circuit which is also conducted through the guns. And there are other manufacturers of arc welding guns who, to eliminate the electric shock hazard, remove the control switch from the hand gun entirely and use an electric control system, commonly called the "touch" or the "scratch" system. With this system the welding current power circuit is live at all times, whether or not the welding arc is in operation, and there is a relay operated switch in series with the welding current circuit so that when the tip of the electrically live welding electrode is brought in contact with the weldment to establish the arc, the control relay switch closes, energizing the electrode feeding machine and opening the solenoid gas valve which furnishes shielding gas to the arc. The disadvantages of this system are that the high open circut voltages of welding current circuits can also produce a severe electric shock, and, should the electrode protruding from the end of the gun accidently strike the weldment or any other metal object in the ground circuit, the welding arc is unintentionally and undesirably established. Deaths by electric shock due to the above causes are too common.

Other objects of this invention are to eliminate the necessity of a control switch in the welding gun so as to reduce the size and the weight of the gun, not necessarily the weight of the switch, but, rather, the additional material required in the construction of the gun to house the switch, and to also eliminate the necessity of running control wiring from the stationary remote welding apparatus to the portable welding gun, thus providing greater flexibility for its manipulation.

A full understanding of this invention may be had from the following description and the attached drawings in which:

FIGURE 1 schematically illustrates one form of gas-shielded metal-arc welding system, the operation of which is controlled by the pressure differential at a point between the shielding gas source and the gas valve located in the welding gun.

Figure 1:
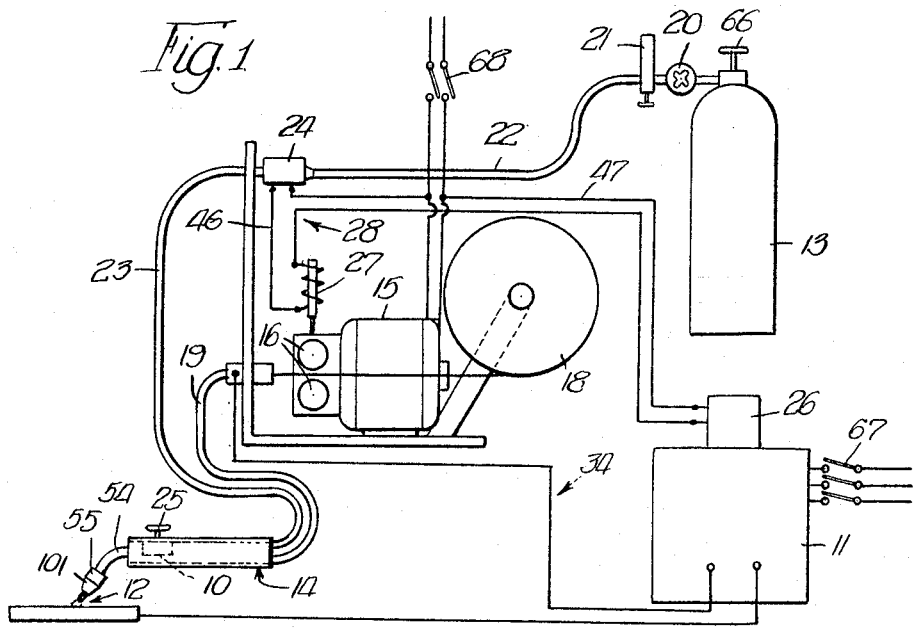

Referring more specifically to the drawings, the system shown in FIGURE 1 contains all of the apparatus required for semiautomatic gas-shielded metal-arc welding which includes a power source 11 to supply welding current to produce the welding arc 12, a tank of gas 13 for shielding the welding operation, a welding gun 14 used by the welding operator to direct the welding arc along the course of welding, an electrode feeding machine 15 containing an electric motor used for driving one pair or more of feed rolls 16 which withdraw the consumable electrode 17 from a source 18 and feed the electrode through a flexible cable 19 and through the welding gun 14 to the welding arc 12. The type of welding application, the type of consumable electrode used and the size of the electrode, plus other factors, necessitate that the rotating speed of the feed rolls 16 be adjustable to vary the electrode feed rate over a rather wide range in inches per minute; a useful feed roll speed adjusting means is disclosed in Bernard patent application Serial No. 439,763, filed March 15, 1965. It is also a requirement that the volume of shielding gas fed to the welding arc be adjustable. The gas volume control comprises a conventional pressure regulator 20 and a conventional flow meter 21 which are serially connected in the shielding gas transmission line to the welding arc 12. In FIGURE 1, the shielding gas transmission line comprises basically the flexible hoses 22 and 23 and the welding gun 14 as connected in series. The welding gun 14 directs the shielding gas around the welding arc 12.

With a conventional electrical control system there would be, in place of that part shown in FIGURE 1 and identified by reference numeral 24, an "off" and "on" solenoid gas valve which would be operated through wiring connected to an "off" and "on" snap-action switch located in the welding gun 14 and operated by a trigger. In the present invention, the pressure regulator 20 and flow meter 21 are connected by the flexible hose 22 to the device 24 which comprises a pressure-operated electrical switch. The switch device 24 is actuated and deactuated by turning the flow of gas on and off by a gas valve 10 located in the welding gun 14 and operated by the trigger 25. A full description of this pressure-operated switch device 24 will be provided further on. It suffices to mention here that when the welding operator presses the trigger 25 on the gun 14 to open the gas valve 10 and feeds gas to the arc zone, the pressure-operated switch device 24 snaps into the "on" position, closing the control circuit 28 to actuate the relay switch 26 which, in turn, energizes the welding current circuit 34 with welding current from the source 11. Closing the control circuit 28 also energizes the solenoid 27 to cause the constantly rotating feed rolls 16 to engage and feed the electrode 17 to the welding arc 12. Therefore, when the welding operator presses the trigger 25, all three materials required to carry out the welding operation, namely, the shielding gas, the electrode, and the welding current, are fed to the arc welding zone, and when the operator releases pressure on the trigger 25, the feeding of these three materials ceases.

Figure 2:
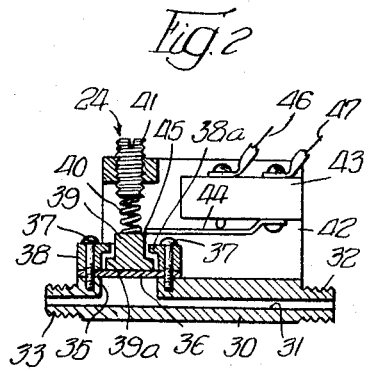
FIGURE 2 is an enlarged cross-sectional view of one form of device effecting electrical control in response to pressure signals in the system shown in FIGURE 1.

Referring now to FIGURE 2, the pressure-operated electrical switch device 24 of the FIGURE 1 system is shown in detail. The pressure-operated switch device 24 comprises a main body portion 30 with a channel 31 therethrough for the passage of the shielding gas. Integral with the body portion 30 are two threaded connectors 32 and 33 for the attachment of the hoses 22 and 23, respectively. A chamber 35 formed in the main body portion 30 communicates directly with the channel 31. A flexible diaphragm 36 forms one wall of the chamber 35 and is confined at its edges by a cylindrical housing 38 which is affixed to the main body portion by screws 37. A movable cylindrical pad 39 is held into contact with the top surface of the diaphragm 36 by a compression spring 40, the compression of which is adjustable by a screw 41. A space is provided between a flange 39a on cylindrical pad 39 and a flange 38a on the plate 38 to limit the amount of inflation to which the diaphragm 36 can be subjected, the space amounting to slightly more than the dimension required to operate the lever 44. A side plate 42 fastened to the main body portion 30 supports a normally-closed, snap-action electrical switch 43 which is equipped with the spring lever 44 for operating the switch snap action. The end 45 of the spring lever 44 rests on top of the movable cylindrical pad 39 and is operated by the rise and fall of the pad 39, which action is produced by rise and fall in the gas pressure. The electrical control circuit 28 is connected to the snap action switch 43 via leads 46 and 47.

Figure 3:
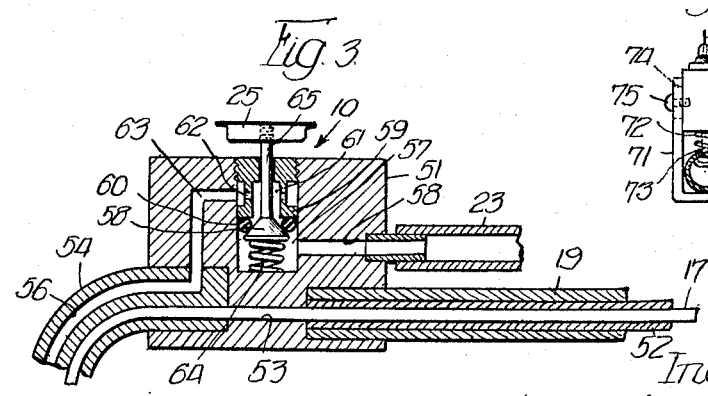
FIGURE 3 is an enlarged cross-sectional view of a gas valve assembly for use in the system shown in FIGURE 1.

Turning now to FIGURE 3, the structure of the gas valve 10 within the welding gun 14 is shown in detail. The main body portion 51 of the gun 14 forms the gas valve 10 housing.

Before considering the structure specific to the gas valve 10, it may be noted by way of environment that the welding cable 19 is attached to one side of the main body portion 51 with a flexible electrode conduit 52 disposed within the core of the cable 19. The conduit 52 is aligned with a bore 53 in the main body portion 51 for conducting the consumable electrode 17 therethrough. Attached to the same side of the main body portion 51 is the shielding gas hose 23. Attached to the opposite side of the body portion 51 is a gooseneck member 54 through which the welding current and the consumable electrode 17 are conducted to the head portion 55 of the welding gun 14. The shielding gas also is conducted to the head portion 55 via a conduit 56 in the gooseneck member 54. For greater detail regarding the nature of the welding gun, reference is made to Bernard patent application Serial No. 477,351, filed July 21, 1965.

Considering now the structure specific to the gas valve 10, it is seen that the gas hose 23 communicates with an inlet pressure chamber 57 via a channel 58. A conical valve member 58 disposed within the inlet chamber 57 is adapted to be seated on a valve seat formed by one end of a member 59 threaded into the main body portion 51. An O-ring 60 formed of rubber or neoprene may be disposed between the member 59 and the conical valve member 58 to insure effective closing of the gas valve 10. A central chamber 61 is provided in the member 59 on the downstream side of the valve seat. The chamber 61 communicates with the conduit 56 in the gooseneck member 54 via restricted orifice 62 and a channel 63. The valve member 58 is biased into a seat or close position by a compression spring 64 disposed in the chamber 57. To unseat the valve member 58 and thereby open the gas valve 10, manual force is applied to the trigger 25 which is affixed to the valve stem 65. This unseats the valve member 58, allowing shielding gas to flow through the restricted orifice 62 and to head portion 55 of the gun via the conduit 56. When the trigger 25 is released, the compression spring 64 returns the valve member 58 to its seated position, shutting off the flow of gas to the welding arc.

The operation of the system shown in FIGURES 1 through 3 is as follows. To prepare the apparatus for gas-shielded metal-arc welding, the valve 66 on the top of the gas tank 13 is opened, and the pressure regulator 20 and the flow meter 21 are adjusted to feed the required volume of gas to the welding operation. These adjustments are made while holding the gas valve 10 in the gun 14 in an open position so that the actual flow of gas can be adjusted. With these adjustments made and pressure on the trigger 25 of the gas valve 10 removed, the pressure of the shielding gas builds up throughout the gas conducting system to that pressure which is adjusted at the pressure regulator 20 to force the required cubic footage of gas per hour through the flow meter 21 and through the gas transmission line to the arc zone. The pressure required will vary with the type of flow meter 21 used, which in some cases is nothing more than a disc with a measuring orifice in its center, with the size of the hoses used, with the length of the hoses, with the restrictions of apparatus channelways, etc. Accordingly, the pressure required to force the required volume of gas through the flow meter 21 and the restrictions as a whole will vary from about 15 to 80 p.s.i. The cubic footage of shielding gas per hour required is primarily governed by the type of gas used and by the overall size of the actual welding operation to be efficiently blanketed by the gas, and generally varies from about 15 to 70 cubic feet per hour.

To understand the operation of the system shown in FIGURE 1, it is important to understand that it is primarily the differential or change in gas pressure originating at the flow meter 21 that operates the pressure-operated switch device 24. When the equipment as a whole has been adjusted and prepared for welding, which includes closing power line switches 67 and 68, maximum shielding gas pressure exists throughout the gas conducting system which includes the chamebr 35 under the diaphragm 36. At this maximum pressure level, the diaphragm 36 is inflated or flexed upwardly, compressing the spring 40 through the cylindrical pad 39 which also moves the spring lever 44 upward. The normally-closed snap-action switch 43 is snapped into the "off" position, thereby opening the control circuit 28 containing the solenoid 27 and the relay switch 26. However, when the welding operator points the end of the gun 14 toward the area to be welded and presses the trigger 25 to open the gas valve 10 in the welding gun, the gas pressure downstream of the flow meter 21, including the pressure in the chamber 35, drops to a reduced value, whereby the diaphragm 36 is deflated by the compression spring 40, the compressive value of which has been set to be slightly greater than the reduced pressure of gas under the diaphragm when the gas flow is at full volume. Hence, the snap-action switch 43 snaps into its normally-closed "on" position, closing the electrical control circuit 28 and energizing the solenoid 27 and the relay switch 26 and thus feeding both electrode and welding current to produce the welding operation.

The reduced shielding gas pressure in the chamber 35 when gas is flowing through the system at full volume will depend upon the particular apparatus involved. In general practice, with different makes of apparatus this reduced pressure varies between 3 and 20 p.s.i. As mentioned above, the pressure spring 40 is adjusted to flatten out the diaphragm 36 at a selected pressure level slightly greater than the full volume flow pressure. When the pressure in the chamber 35 drops below this selected pressure level, the snap-action switch 43 closes, and a greater pressure will be required to again return the snap-action switch to its open position. The procedure for adjusting the spring 40 is as follows. With the gas valve 10 in the welding gun open, the spring 40 should be compressed to a point to where the spring is solid and will not further compress. Then the adjusting screw 41 should be turned out, counter-clockwise, until the snap-action switch 43 snaps into the "off" position. The adjusting screw 41 should then be turned in clockwise until the snap-action switch 43 snaps into the "on" position.

The system described provides a purging of the weld area where the arc is to be established by a strong blast of shielding gas to remove rust, dirt, and slag particles before the arc is established. This is accomplished for the reason that, when the gas valve 10 in the gun is opened, the full force of the regulated pressure is discharged out of the gas nozzle of the welding gun 14, but welding electrode and welding current are not turned on by the pressure-operated switch device 24 until the pressure under the diaphragm 36 is reduced to the selected pressure level. The dwell time between the point in time at which the shielding gas is turned on and the point in time at which the arc is established is primarily governed by the amount of pressure used and the displacement within the gas conducting system, and typically is about one second. In fact, it is preferred that the size and the length of the conducting hose be such that the dwell time not be longer than two seconds.

Figure 4:
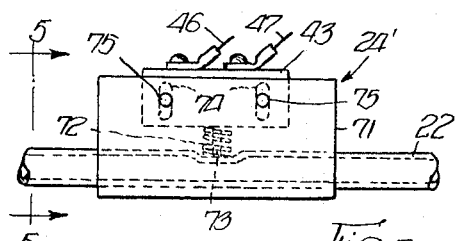
FIGURE 4 is an enlarged side view in elevation of a device which performs the same function as the device shown in FIGURE 3 but which is simple and less costly.
Figure 5:
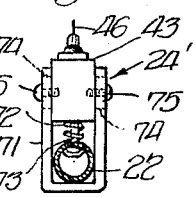
FIGURE 5 is an end view taken along the line 5—5 in FIGURE 4.

Referring now to FIGURES 4 and 5, the pressure-operated switch device 24' accomplishes the same end result as the pressure-operated switch device 24 shown in FIGURE 2, but is of a much simpler design and, hence, less costly to manufacture and purchase. It is intended primarily to be used with welding equipment which deposits the smaller sizes of electrode, with correspondingly less welding current and less shielding gas, and which requires a lower maximum pressure. As is obvious, this gas-electric control device 24' consists of only three major parts, namely, a channel-shaped main body member 71, the normally-closed snap-action switch 43, and a compression type spring 72. For operation, the gas conducting hose 22 is threaded through channel-shaped body member 71. The inside width of the channel-shaped member 71 is slightly greater than the outside diameter of the gas hose 22. More exactly, in general practice a ¼-inch I.D. hose with a ½-inch O.D. is used for conducting the shielding gas from the gas tank source to the welding gun. For a hose of this size, the inside width of the channel member 71 is ½ inch plus 1/32 inch or about 17/32 inch. The reason for this looseness is to provide a slight flattening of the hose under the compression force of spring 72 at the reduced pressure level when shielding gas is flowing at full volume through the hose to the welding arc, which pressure level generally does not exceed 2 or 3 p.s.i. when the maximum pressure level with the gas valve 10 closed does not exceed 30 p.s.i. The actuating pin 73 extends from the surface of the snap-action switch 43 about ½ inch, and the snap-action of the switch, which snaps the contact points from the normally-closed "on" position to the "off" position, requires a depression of the pin 73 about 1/32 inch. The normal length of the compression spring 72 and its compression valve is such that when the spring is pressed down against the hose 22 to flatten the ½-inch O.D. hose to about 7/16 inch, the length of the spring is about equal to the length of pin 73, meaning about ½ inch. The mounting holes 74 in the channel-shaped member 71 for mounting the snap-action switch 43 via screws 75 are elongated to facilitate the above-mentioned adjustments.

Very briefly described, the operation of the device 24' shown in FIGURES 4 and 5 is as follows. When the gas valve 10 in the welding gun is closed, the gas hose 22 under the spring 72 is fully rounded out to its ½-inch O.D. because of the presence of maximum gas pressure therein. Therefore, the spring 72 is compressed to about 15/32-inch length, and the actuating pin 73 is depressed into the snap-action switch 43 such that the contact switch points are in the "off" position. When the gas valve 10 is opened in the gun, the gas pressure in the hose drops to its reduced, full volume flow level, allowing the spring 72 to flatten the hose 22 sufficiently to permit the actuating pin 73 to again extend to its ½-inch length which, in turn, permits the snap-action switch 43 to snap into its normally-closed "on" position. Preferably, the compressive value of the spring 72 is such as to permit the snap-action switch 43 to snap "on" at a selected pressure level slightly greater than the full volume flow pressure level.

Figure 6:
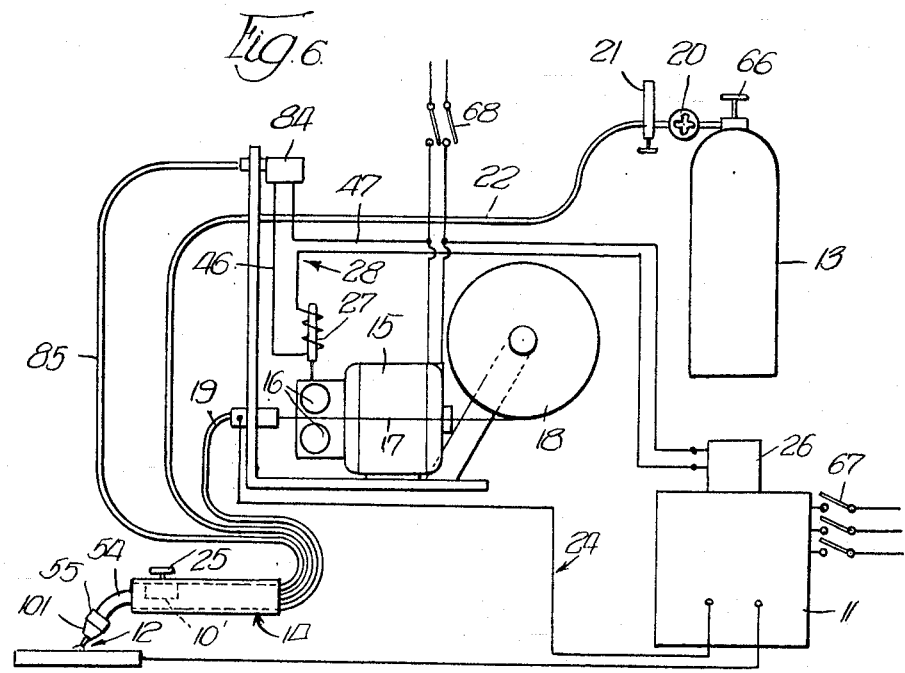
FIGURE 6 illustrates another form of gas-shielded metal-arc welding system which differs from the system shown in FIGURE 1 in that operation is controlled by a pressure differential at a point between the gas valve in the welding gun and the arc end of the gun.

Referring now to FIGURE 6, the form of the control system shown therein differs from the FIGURE 1 form of the control system in three principal respects, namely:

(1) In the system of FIGURE 6, it is a back-up pressure downstream of the gas valve 10 which closes a pressure-operated snap-action switch device 84 to effect feed of the electrode 17 and the welding current to produce the welding arc, and not an upstream pressure as in FIGURE 1.

(2) The control switch device 84 is a normally-open (off) switch and not a normally-closed (on) switch as 24 in FIGURE 1.

(3) The arrangement of apparatus in FIGURE 6 uses a second gas hose 85 extending from the gun to the remote pressure-operated switch device 84.

Figure 7:
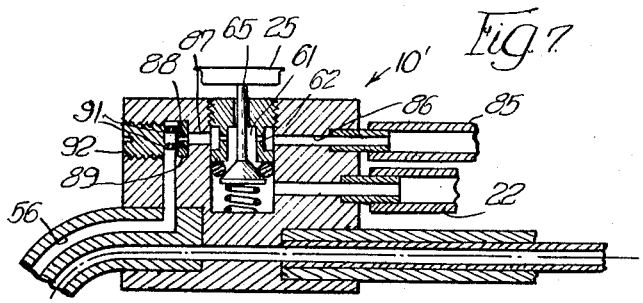
FIGURE 7 is an enlarged cross-sectional view of a gas valve assembly for use in the system shown in FIGURE 6.

The difference between the system of FIGURE 6 and the system of FIGURE 1 is reflected in the arrangement of the gas valve 10' employed in the system of FIGURE 6. The gas valve 10', as shown in FIGURE 7, differs from the gas valve 10 of FIGURE 3 in the following respects. The additional gas hose 85 communicates via channel 86 with the channel 87 which is downstream of the chamber 61 and the orifices 62. The channel 87 also communicates with the channel 56 through a restricted orifice 88 in a disc 89 and restricted orifices 91 in a plug 92 which holds the disc 89 in place.

Figure 8:
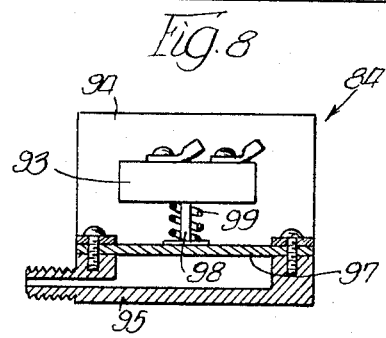
FIGURE 8 is an enlarged cross-sectional view of a device effecting electrical control in response to pressure signals in the system shown in FIGURE 6.

The pressure-operated switch device 84 is shown in detail in FIGURE 8. A normally-open snap-action switch 93 is mounted on a plate 94 or other support which is affixed to a casing 95 having a pressure chamber 96. The top wall of the chamber 96 is formed by a diaphragm 97 against which the actuator pin 98 is biased by a compression spring 99.

The system operates as follows. When valve stem 65 is pressed and the valve 10' is opened, a surge of gas is fed into chamber 61 of the gas valve from which the gas flows in two directions, namely, through the channel 56 to the welding arc and through the hose 85 to the pressure chamber 96 in the pressure-operated switch device 84. The diaphragm 97 is inflated, pressing in the stem 98 of the snap-action switch 93 to close the points of this normally-open switch, thus closing the control circuit 28.

For the successful operation of the system of FIGURE 6, it is important that sufficient back-up pressure under the diaphragm 97 remain as long as the gas valve 10' is held open. For example, if nine ounce force is required to retain the snap-action switch 93 closed and if the diameter of diaphragm 97 is two inches to provide a surface area of 3.1416 square inches, then approximately a three ounce per square inch back-up pressure must be maintained under the diaphragm 97. Actually, a back-up pressure of more than three ounces per square inch is normally produced by the resistance to the flow of gas through the welding gun head portion 55 in which there are normally small orifices of the type shown in the Bernard application Serial No. 477,351, filed July 21, 1965, which break up the single stream of gas from the channel 56 to produce a laminar flow of gas out of the gas nozzle 101 to blanket the arc 12.

The disc 89 containing the orifice 88 which restricts the flow of gas to produce the back-up pressure is shown in FIGURE 7 principally to aid in understanding the operation of the control system. In some applications, the presence of the restrictor 88 may be advantageous. Normally the further restriction provided by the orifice 88 will not be needed due to the restrictive effect of the small orifices generally found in the head portion 55 of welding gun. Obviously, when the gas valve 10' is shut off, the pressure in both the channel 56 and the hose 85 and also in the chamber 61 drops to atmospheric or zero relative pressure, permitting the snap-action switch 93 to return to its normally-open position.

It has been found that the form of the invention shown in FIGURES 6 through 8 tends to be more rapid in operation than the form of the invention shown in FIGURES 1 through 4, and the necessity for the additional hose 85 is completely offset by the elimination of control circuit wiring as conventionally used when the control switch is located in the welding gun.

Although certain specific terminology and uses have been specified in the description of the invention, it is to be understood that this is primarily by way of example and not to be construed as a limitation. It will be apparent to those skilled in the art that modifications may be made within the scope of the claims without departing from the spirit of the invention. For example, although this invention, for reasons of brevity, has been described and illustrated herein as applied to the commonly known gas-shielded metal-arc welding processes, it is equally valuable for applying gas-shielded nonconsumable arc welding processes, such as when the electrode is tungsten metal. Also, due to the very high arc voltages used for plasma arc welding, this invention is even more valuable for applying the plasma arc welding processes of the type where the electrode is melted by the plasma arc and deposited as weld metal and also the nonconsumable tungsten electrode types where the plasma arc is used for fusing the base metal only.

What is claimed is:

1. In gas-shielded arc welding apparatus which includes a welding gun for manually or mechanically directing the welding operation along the course of welding, apparatus for feeding consumable electrode from a remote source through a conduit to and through the welding gun to the welding arc, a welding current circuit for energizing said electrode with welding current from a remote welding current source, and a gas transmission line for conducting shielding gas under pressure from a remote source to and through the welding gun to the welding arc, the combination therewith to provide a control system for operating the arc welding apparatus comprising: a manually operated gas valve incorporated with said welding gun and connected in said gas transmission line for feeding shielding gas when open and stopping the flow of shielding gas when closed; and a remote gas-pressure-operated electrical switch having a pressure connection with said gas transmission line at a location along said gas transmission line and being electrically connected for energizing and de-energizing said electrode feeding apparatus and said welding current circuit, said gas-pressure-operated electrical switch being responsive to the pressure level at said location along said gas transmission line when said gas valve is open to energize said electrode feeding apparatus and said welding current circuit, said gas-pressure-operated electrical switch being responsive to the pressure level at said location along said gas transmission line when said gas valve is closed to de-energize said electrode feeding apparatus and said welding current circuit.

2. In gas-shielded arc welding apparatus which includes a welding gun for manually or mechanically directing the welding operation along the course of welding, apparatus for feeding consumable electrode from a remote source through a conduit to and through the welding gun to the welding arc, a welding current circuit for energizing said electrode with welding current from a remote welding current source, and a gas transmission line for conducting shielding gas under pressure from a remote source to and through the welding gun to the welding arc, the combination therewith to provide a control system for operating the arc welding apparatus comprising: a manually operated gas valve incorporated with said welding gun and connected in said gas transmission line for feeding shielding gas when open and stopping the flow of shielding gas when closed; and a remote gas-pressure-operated electrical switch having a pressure connection to said gas transmission line at a location along said gas transmission line upstream of said gas valve and being electrically connected for energizing and de-energizing electrode feeding apparatus and said welding current circuit, said gas-pressure-operated electrical switch being responsive to the pressure level at said location along said gas transmission line when said gas valve is open to energize said electrode feeding apparatus and said welding current circuit, said gas-pressure-operated electrical switch being responsive to the pressure level at said location along said gas transmission line when said gas valve is closed to de-energize said electrode feeding apparatus and said welding current circuit.

3. The combination defined in claim 2 wherein said gas transmission line is restricted upstream of said location such that the gas pressure at said location drops when said gas valve is opened and increases when said gas valve is closed.

4. In gas-shielded arc welding apparatus which includes a welding gun for manually or mechanically directing the welding operation along the course of welding, apparatus for feeding consumable electrode from a remote source through a conduit to and through the welding gun to the welding arc, a welding current circuit for energizing said electrode with welding current from a remote welding current source and a gas transmission line for conducting shielding gas under pressure from a remote source to and through the welding gun to the welding arc, the combination therewith to provide a control system for operating the arc welding apparatus comprising: a manually operated gas valve incorporated with said welding gun and connected in said gas transmission line for feeding shielding gas when open and stopping the flow of shielding gas when closed; and a remote gas-pressure-operated electrical switch having a pressure connection to said gas transmission line at a location along said gas transmission line downstream of said gas valve and being electrically connected for energizing and de-energizing electrode feeding apparatus and said welding current circuit, said gas-pressure-operated electrical switch being responsive to the pressure level at said location along said gas transmission line when said gas valve is open to energize said electrode feeding apparatus and said welding current circuit, said gas-pressure-operated electrical switch being responsive to an increase in the pressure level at said location along said gas transmission line when said gas valve is closed to de-energize said electrode feeding apparatus and said welding current circuit.

5. The combination defined in claim 4 wherein said gas transmission line is restricted downstream of said location such that the pressure at said location increases when said gas valve is opened and decreases when said gas valve is closed.

6. A control system for gas-shielded arc welding apparatus which includes a welding gun, a welding current circuit including a remote welding current source, and a gas transmission line for conducting shielding gas from a remote source to and through the welding gun to the welding zone, said control system comprising: a manually operated gas valve disposed in said welding gun and connected in series in said gas transmission line; and a gas-pressure-operated electrical switch electrically connected for energizing said welding current circuit when closed and de-energizing said welding current circuit when open, said gas-pressure-operated electrical switch having a pressure chamber communicating with said gas transmission line at a location along said gas transmission line, said gas-pressure-operated electrical switch being adapted to close in response to a drop in gas pressure at said location when said gas valve is opened, said gas operated electrical switch being adapted to open in response to an increase in gas pressure at said location when said gas valve is closed.

7. The control system defined in claim 6 wherein said gas-pressure-operated electrical switch comprises a normally-closed snap-action electrical switch and flexible means for opening said snap-action switch in response to said increase in gas pressure communicated to said pressure chamber when said gas valve is closed and for permitting said snap-action switch to close in response to said drop in gas pressure communicated to said pressure chamber when said gas valve is opened.

8. A control system for gas-shielded arc welding apparatus which includes a welding gun, a welding current circuit including a remote welding current source, and a gas transmisison line for conducting shielding gas from a remote source to and through the welding gun to the welding zone, said control system comprising: a manually operated gas valve disposed in said welding gun and connected in series in said gas transmission line; and a gas-pressure-operated electrical switch electrically connected for energizing said welding current circuit when closed and de-energizing said welding current circuit when open, said gas-pressure-operated electrical switch having a pressure chamber communicating with said gas transmission line at a location along said gas transmission line, said gas-pressure-operated electrical switch being adapted to close in response to an increase in gas pressure at said location when said gas valve is opened, said gas-pressure-operated electrical switch being adapted to open in response to a drop in gas pressure at said location when said gas valve is closed.

9. The control system defined in claim 8 wherein said gas-pressure-operated electrical switch comprises a normally-open snap-action switch and flexible means for closing said snap-action switch in response to said increase in gas pressure communicated to said pressure chamber when said gas valve is opened and for permitting said snap-action switch to open in response to said drop in gas pressure communicated to said pressure chamber when said gas valve is closed.

10. In arc welding apparatus which includes a welding gun for manually or mechanically directing the welding operation along the course of welding, a welding current circuit including a current source, and a gas transmission line for conducting gas under pressure from a source to the welding arc, the combination therewith comprising: a gas valve associated with said welding gun and serially connected in said gas transmission line; and gas-pressure-operated means disposed remote from said welding gun and in pressure communication with said gas transmission line for closing said welding current circuit in response to one pressure condition in said gas transmission line when said gas valve is opened and for opening said welding current circuit in response to another pressure condition in said gas transmission line when said gas valve is closed.

11. The combination defined in claim 10 wherein said gas-pressure-operated means is in pressure communication with said gas transmission line at a location upstream of said gas valve.

12. The combination defined in claim 11 wherein said gas transmission line is restricted upstream of said location such that the pressure at said location drops when said gas valve is opened and increases when said gas valve is closed.

13. The combination defined in claim 12 wherein said gas-pressure-operated means comprises a normally-closed snap-action electrical switch and flexible pressure responsive means for retaining said switch open when said gas valve is closed.

14. The combination defined in claim 10 wherein said gas-pressure-operated means is in pressure communication with said gas transmission line at a location downstream of said gas valve.

15. The combination defined in claim 14 wherein said gas transmission line is restricted between said location and the welding arc such that the pressure at said location increases when said gas valve is opened and drops when said gas valve is closed.

16. The combination defined in claim 15 wherein said gas-pressure-operated means comprises a normally-open snap-action switch and flexible pressure responsive means for retaining said switch closed when said gas valve is open.

References Cited by the Examiner
UNITED STATES PATENTS

| | | | |
|---|---|---|---|
| 2,517,739 | 8/1950 | Tyrner | 219—130 |
| 3,132,235 | 5/1964 | Anderson | 219—75 |

RICHARD M. WOOD, *Primary Examiner.*